United States Patent [19]

Rupp

[11] Patent Number: 4,680,844
[45] Date of Patent: Jul. 21, 1987

[54] METHOD OF MANUFACTURING A ROTOR

[75] Inventor: James W. Rupp, South Bend, Ind.

[73] Assignee: Allied Corporation, Morristown, N.J.

[21] Appl. No.: 812,610

[22] Filed: Dec. 23, 1985

[51] Int. Cl.⁴ .................. B23P 15/00; B21D 39/00
[52] U.S. Cl. .................. 29/156.4 R; 29/447;
      29/452; 29/525; 403/273; 403/345; 415/75
[58] Field of Search ................. 29/156.4 R, 447, 452,
      29/525; 403/273, 345; 415/75, 503; 74/640,
      458, 431

[56] References Cited

U.S. PATENT DOCUMENTS

| 2,058,613 | 10/1936 | Morris | 415/75 |
| 3,508,773 | 4/1970 | Coberly et al. | 29/156.4 R X |
| 3,559,275 | 2/1971 | Slater | 29/452 |
| 3,831,242 | 8/1974 | Oxlade | 29/452 X |

Primary Examiner—Howard N. Goldberg
Assistant Examiner—Ronald S. Wallace
Attorney, Agent, or Firm—Leo H. McCormick, Jr; Ken C. Decker

[57] ABSTRACT

A method of manufacturing a rotor (70) for use in an air motor. A shaft (10) is machined to have bearing surfaces (16 and 18) and adjacent ends (12 and 14), respectively. A working surface (20) with helix grooves (22, 24 and 26) is machined into the shaft (10). A locking surface (34) is machined into the shaft between the working surface (20) and end (14). A ring (36) is machined with helix grooves (38, 40 and 42) on its periphery and an inner diameter (44). The inner diameter has a diameter less than the locking surface (34) but greater than the bearing surface (18). The ring (36) is placed on bearing surface (18) of shaft (10). The shaft (10) with ring (36) on bearing surface (18) is placed in a fixture (50) and a tension force is applied to ends (12) and 14). The tension force causes the shaft (10) to axially expand and radially contract. When the diameter of the locking surface (34) is approximately equal to the diameter (44) of the ring (36), the ring (36) is pushed into contact with the working surface (20). After the helix grooves (22, 24, 26) are aligned with helix grooves (38, 40 and 42), the tension force is released allowing the locking surface to expand and frictionally hold the shaft (10) and ring (36) together such that a herringbone pattern is formed for rotor (70).

7 Claims, 6 Drawing Figures

METHOD OF MANUFACTURING A ROTOR

BACKGROUND AND SUMMARY OF THE INVENTION

The invention relates to a method of manufacturing a rotor for an air motor. A shaft having a section with spiral grooves located adjacent to a cylindrical section is placed in a fixture. The shaft is placed in tension causing the cylindrical section to contract radially while expanding axially. A ring having spiral grooves is placed on the contracted cylindrical section. On removal of the tension, the cylindrical section expands to form a locking connection between the ring and shaft which holds the spiral grooves in a herringbone pattern.

The use of gears having teeth which meet to form a herringbone pattern is known by industry. A herringbone gear is a combination of two helical gear sets having equal but opposite helix angles. Two methods for manufacturing such herringbone gears are: (1) machine the opposing helix angles on a common gear blank (generally a void is necessary for cutting tool runout between the two gear patterns); or (2) machine each helix gear independently and then assemble them to a common shaft to form the herringbone gear. The most common method is to join two independently machined helical gears to a shaft to form a herringbone rotor. Thereafter, gears can be bound by welding, brazing, threading, diffusion bonding, shrink fit in conjunction with heating the ring member and/or cooling the shaft member, pinning, etc. Rotors made by some of these methods of joining the parts together were supplied with hot gas to simulate the operation of an air motor in an aircraft. The hot gas is compressor discharge air and can reach a temperature of 1050° F. and pressure of 600 psig. The air acts upon a pair of rotors and drives the rotors at speeds above 20,000 RPM at acceleration and deceleration rates up to 16,000 revolutions per second$^2$. Closed clearances must be maintained between the rotors and between each rotor and the motor housing to achieve reasonable engine efficiency and motor output torque.

Rotor tooth form accuracy limits approach those of conventional gearing though the rotor is a three-tooth gear, with a 45° helix angle on each half of the herringbone gear form. The dimensional accuracies must accommodate thermal changes in growth between rotor centerlines and motor housing dimensions through transients of temperature change of several hundred degrees in less than a second of time. The herringbone pattern must withstand reversing loads which are radial and axial.

To achieve the herringbone rotor accuracy, the helical gears must be aligned rotationally within approximately 0.001 of an inch, and the gear end faces must mate without a gap and remain gap-free during operation in the motor. The gear profile must be maintained within about a 0.002 inch tolerance band.

The conventional methods of joining the gears described were evaluated for these conditions and were found undesirable.

When the gears were welded, it was difficult to inspect the weld joint sufficiently to ensure suitable reliability for use as a rotor in an air motor for an aircraft.

When the gears were brazed, it was difficult to inspect the joint adequately, and the close tolerance gear profile was jeopardized by the high temperature required to achieve the brazing.

The gears could not be threaded since the space limitations in the rotor precluded the design of sufficient threads to assure structural integrity.

When the gears were bonded by the diffusion process, the gear profile was distorted due to the high temperature of the process, and the joint could not be inspected adequately to ensure a suitable bond was achieved.

When the gears were joined by shrink fit by heating one gear and cooling the other gear, the close tolerance required to align the helix could not be achieved repeatedly, since only a few seconds were available to achieve the final assembly before the temperatures equalized sufficiently to lock the joint.

When the gears were joined to the shaft by pinning or staking the interface joint was not sufficiently tight to provide the structural rigidity needed of the rotor.

The method of manufacturing a rotor according to the invention disclosed herein is repeatable, controllable and does not result in distortions of the helix or spiral gears. In addition this rotor can now be manufactured by commonly used gear forming equipment. Whereas similar type rotors essentially limited to manufacture on a Sykes Gear Machine.

In the invention, a shaft is machined to have: (1) bearing sections located adjacent the ends thereof; (2) a series of spiral grooves that extend to the midpoint of the shaft; and (3) a locking section located between the end face of the spiral grooves and the other end of the shaft. At the same time, a ring is machined to have a series of spiral grooves on its periphery. Thereafter, the ring is placed on the bearing surface adjacent the locking surface and the shaft placed in a fixture. A tension load was placed on the shaft through the ends which causes the shaft to elongate axially and shrink radially. The inner diameter of the ring and the initial diameter of the locking surface are designed to be within a few thousandth of an inch (0.0004 inches) and as a result the required shrinkage is within the elastic range of the shaft material. Once the desired shrinkage is achieved, the tension load on the shaft can be maintained as long as necessary to slip the gear ring in place and index it rotationally to achieve the precise gear alignment, and to clamp the helical gears together to achieve intimate contact between the gear end faces.

When the tension load is released from the shaft ends, the shaft length shortens and the shaft diameter expands. Since the gear ring and shaft were sized or matched to achieve an interference fit in their free state, the resulting joint is a self-locking interference fit on the shaft journal and gear ring hub.

The mating gear end faces also are placed in compression by the shortening that occurs in the shaft length. This compression preload between the gear end faces provides the radial stiffness required of the rotor to withstand radial loads due to air pressure and rotor to rotor contact forces during motor operation.

An advantage of this method of manufacturing a rotor occurs through the individual machining of two helical gears which are later joined together to form a unitary structure.

An object of this invention is to provide a method of manufacturing a two piece herringbone rotor whereby a ring section is locked to the shaft and a first section of the rotor through an interference fit.

BRIEF DESCRIPTION OF THE DRAWINGS

These advantages and objects of this invention should be apparent from reading this specification while viewing the drawings wherein.

DETAILED DESCRIPTION

Figure 1:
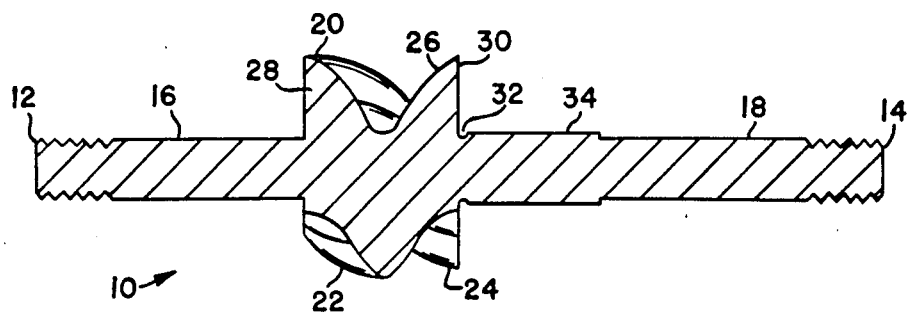
FIG. 1 is a sectional view of a shaft having a helix groove thereon.

The shaft 10 of the rotor for an air motor shown in FIG. 1 is either made from bar stock or cast and then machined to the configuration shown. The shaft 10 has a first end 12 and a second end 14. The ends 12 and 14 are threaded adjacent bearing sections 16 and 18. A first section 20 on shaft 10 has a plurality of spiral grooves 22, 24 and 26 located on its periphery. The faces 28 and 30 on section 20 are substantially perpendicular to the axis of shaft 10. A groove 32 placed adjacent a locking surface 34 reduces the diameter of the shaft between the locking surface 34 and first section 20 to that of the bearing surfaces 16 and 18. Each of the spiral grooves 22, 24 and 26 form a portion of a helix such that from the first face to the second face about 120° is transversed. This type helix can be machined with standard gear cutting equipment and as a result the tooling wear rate should be lowered and the quantity of potential suppliers should increase as compared with the prior art.

Figure 2:
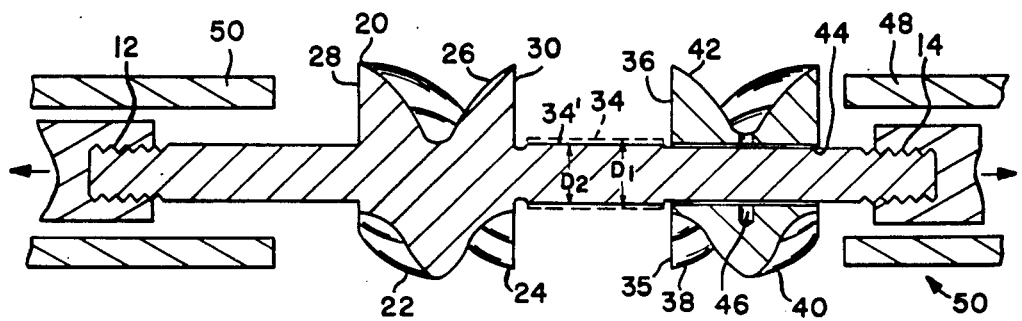
FIG. 2 is a sectional view of the shaft in FIG. 1 and ring thereon in a fixture.
Figure 3:
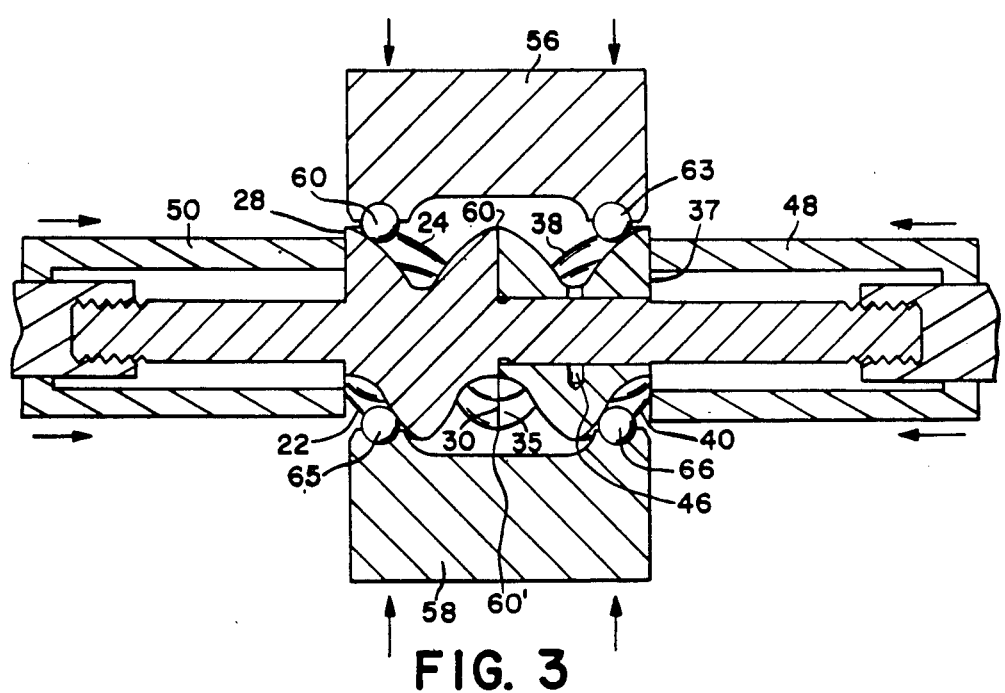
FIG. 3 is a sectional view of the shaft of FIG. 2 with the helix sections on the shaft and ring held in a herringbone pattern.

At the same time a ring 36 (see FIG. 2) made of the same metal material as shaft 10 has a series of spiral grooves 38, 40 and 42 cut in its peripheral. The inner diameter 44 of the ring is machined to a size which is greater than the bearing surfaces 16 and 18 on shaft 10 but less than the locking surface 34. The ring 36 is placed on bearing surface 18 and the shaft 10 placed in a fixture 50 as illustrated in FIG. 2. The ends 12 and 14 are attached to the fixture 50 and a tensioning force is applied to the shaft 10. This tensioning force causes the shaft 10 to expand axially and contract radially. The radial contraction is effective for the entire shaft 10 but is illustrated in FIG. 2 for the locking surface 34 which is shown in phantom being reduced from a diameter $D_1$ to $D_2$. When diameter $D_2$ is approximately equal to the inner diameter 44 on ring 36, arms 48 and 50 move toward each other. Arm 50 contracts face 28 and arm 48 contacts face 37 on ring 36. Arm 48 moves the ring 36 onto the locking diameter 34 until face 35 engages face 30 on the first section 20 as shown in FIG. 3. Thereafter, rollers 60, 62, 63 and 65 on guide members 56 and 58 are moved to engage the helix surfaces 22, 24, 26, 38, 40 and 42 such that an apex 60, only one of which is shown, is formed to produce a herringbone pattern. Thereafter, the tensioning force on ends 12 and 14 is terminated allowing shaft 10 to contract axially and expand radially. As locking surface 34 expands, frictional engagement occurs with the inner diameter 44 of the ring 36. In addition, as shaft 10 contracts axially face 35 engages face 30 to provide a tight joint between the parts and as such the two parts now function as a single structure.

Figure 4:
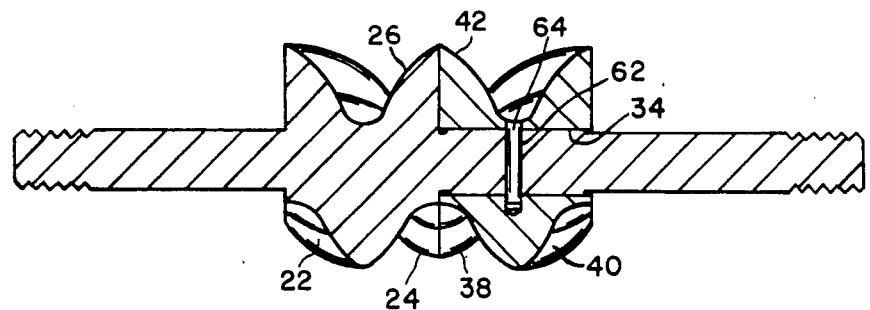
FIG. 4 is a sectional view of the shaft of FIG. 3 with the ring attached thereto with a secondary locking pin connected to the shaft.

After the tensioning force is removed from ends 12 and 14 and the modulus of elasticity has returned the ends 12 and 14 to their approximate linear dimension as illustrated in FIG. 1, a hole 46 is drilled in ring 36 and a hole 63 is drilled in shaft 10 through the locking surface 34. Pin 65 as seen in FIG. 4 is inserted into holes 63 and 46 to provide a backup lock to assure that the parts remain joined after a period of use.

Figure 5:
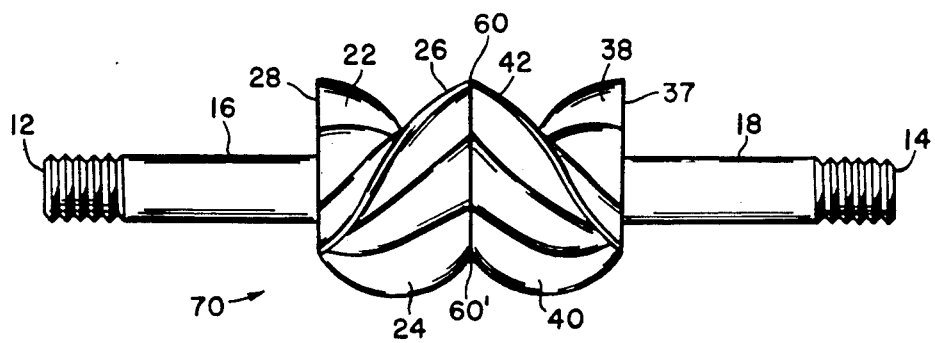
FIG. 5 is the produce produced by this method of manufacture.

Thereafter, arms 48 and 50 are moved away from faces 28 and 37 and the rotor 70 as best seen in FIG. 5 is removed from the fixture 50. The surface of rotor 70 has a herringbone pattern formed by the intersection of the helix surfaces at apexes 60, 60', and one that is not shown. This rotor 70 was nitrided and balanced. It was bench tested and compared to a one piece rotor of the same size. When subjected to the same radial load the axial deflection of the rotor 70 was measured to be about 0.0009", only slightly more than the one piece rotor which had a deflection of 0.0008". Such deflection is important to avoid excessive wear with the matching rotor or contact with the housing in the air motor. As wear or contact occurs, the efficiency of the air motor is proportionally affected. The air motor can tolerate the slight increase in radial destruction observed with rotor 70.

Figure 6:
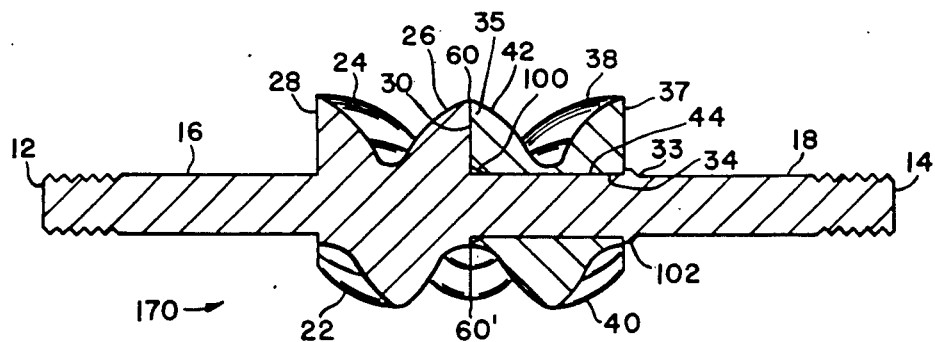
FIG. 6 is a sectional view of a secondary embodiment manufacture by the invention disclosed herein.

In the embodiment shown in FIG. 6, the components are identical to the rotor in FIG. 5; the only differences are that the relief groove 32 has been removed from the shaft 10, and the locking surface 34 now extends to face 30, and hole 46 is not needed in ring 36.

In order to assure that the faces 30 and 35 make full contact across their surfaces, a bevel surface 100 is machined on the edge formed by the intersection of face 35 and inner diameter 44 on ring 36. The locking surface 34 has a linear dimension greater than the linear dimension between faces 35 and 37 of the ring 36. After the tension force has been removed from end 12 and 14 but prior to removal of arms 48 and 50, a compressive force is applied to the shoulder 33 formed between the locking surface and bearing surface 18 to define a shear barrier 102 that forms auxiliary lock that retains the ring 36 on shaft 10 to form rotor 170.

I claim:

1. A method of manufacturing a rotor for use in an air motor comprising the step of:

placing a shaft having a first end and a second end in a fixture, said shaft having a first section with a series of spiral grooves which extend from a first face to a second face, said first and second faces being located in parallel radial planes which are substantially perpendicular to the axis of said shaft, said shaft having a second and third section located between said first section and said second end, said second section having a larger diameter than said third section;

sliding a ring on said third section, said ring having a peripherial surface with a second series of spiral grooves that extend from a third face to a fourth face, said ring having an inner diameter that is greater than said third section but less than said second section;

pulling on said first and second ends causing said shaft to expand axially while being radially compressed until the diameter of said second section substantially equals the inner diameter of said ring;

pushing said ring into said second section until said third face engages said second face; and releasing said first and second ends to allow said shaft to axially contract and radially expand to produce a first locking connection between said inner diameter and said second section such that said first and second spiral grooves form a herringbone pattern for said rotor.

2. The method of manufacturing a rotor as recited in claim 1 wherein said step of releasing said first and second ends includes the step of:

forming a second locking connection between said second and third faces as said shaft axially contracts, said second locking surface producing radial stiffness to substantially minimize axial deflection when said rotor is subjected to operational loads.

3. The method of manufacturing a rotor as recited in claim 2 further including the steps of:

drilling a first radial hole in said ring prior to placing the ring on said third section;

drilling a second radial hole in said shaft in alignment with said first radial hole after releasing said first and second ends; and inserting a pin in said first and second radial holes to aid in holding said first and second spiral grooves in said herringbone pattern.

4. The method of manufacturing a rotor as recited in claim 2 further including the step of:

forming a flange on said shaft between said second and third sections, said flange engaging said fourth face to aid in sustaining said second locking connection.

5. The method of manufacturing a rotor as recited in claim 4 further including the step of:

forming a groove between said second face and second section, said groove providing a relief to assure that the faces make full contact across their surfaces.

6. The method of manufacturing a rotor as recited in claim 4 further including the step of:

beveling the edge of said third face adjacent said inner diameter, said beveled edge providing relief to assure that the second and third faces make full contact across their surfaces.

7. The method of manufacturing a rotor as recited in claim 2 further including the step of:

holding said first and second series of spiral grooves in alignment until said first and second locking connections have been established.

* * * * *